(12) United States Patent
Zhang

(10) Patent No.: US 8,437,555 B2
(45) Date of Patent: May 7, 2013

(54) METHOD FOR IDENTIFYING MOTION VIDEO CONTENT

(75) Inventor: Ji Zhang, Monte Sereno, CA (US)

(73) Assignee: Yuvad Technologies, Inc., San Jose, CA (US)

( * ) Notice: Subject to any disclaimer, the term of this patent is extended or adjusted under 35 U.S.C. 154(b) by 605 days.

(21) Appl. No.: 12/085,830

(22) PCT Filed: May 22, 2008

(86) PCT No.: PCT/CN2008/071046
§ 371 (c)(1),
(2), (4) Date: May 30, 2008

(87) PCT Pub. No.: WO2009/026803
PCT Pub. Date: Mar. 5, 2009

(65) Prior Publication Data
US 2011/0007932 A1    Jan. 13, 2011

Related U.S. Application Data

(60) Provisional application No. 60/966,201, filed on Aug. 22, 2007.

(51) Int. Cl.
*G06K 9/46* (2006.01)
*G06K 9/00* (2006.01)

(52) U.S. Cl.
USPC .............. 382/194; 382/100; 725/19; 386/241

(58) Field of Classification Search ................... 382/100, 382/306; 386/241
See application file for complete search history.

(56) References Cited

U.S. PATENT DOCUMENTS 3,919,479 A * 11/1975 Moon et al. .................. 704/237
5,019,899 A *  5/1991 Boles et al. ..................... 725/22
(Continued)

FOREIGN PATENT DOCUMENTS

CN    1190218 A    8/1998
CN    2387588 Y    7/2000
(Continued)

OTHER PUBLICATIONS

Non-final Office Action dated Oct. 26, 2010, for U.S. Appl. No. 12/085,928.

(Continued)

*Primary Examiner* — Matthew Bella
*Assistant Examiner* — Patrick Edwards
(74) *Attorney, Agent, or Firm* — Vista IP Law Group, LLP

(57) ABSTRACT

A method for identifying motion video content, forming a registered fingerprint database in advance for video contents of broadcasting video signals, wherein said method at least comprises the steps of storing a consecutive of video frame images of a motion video content to be identified into a frame buffer; obtaining sample values on the video frame images by a frame sampler; holding the sample values in a fingerprint store as a fingerprint A for search in the fingerprint database; and performing a fingerprint pattern matching algorithm between the fingerprint A for search in the fingerprint database and fingerprints B contained in the fingerprint database so as to determine whether the motion video content has ever been broadcasted before. The method according to the present invention can effectively organize, archive, and search video content; lower the cost of digital storage devices; and identify video content efficiently and with minimal or no human interactions.

8 Claims, 6 Drawing Sheets

U.S. PATENT DOCUMENTS

| | | | |
|---|---|---|---|
| 5,870,754 | A | 2/1999 | Dimitrova et al. |
| 5,926,223 | A | 7/1999 | Hardiman |
| 6,037,986 | A * | 3/2000 | Zhang et al. ............. 375/240.12 |
| 6,084,539 | A | 7/2000 | Yamada |
| 6,374,260 | B1 | 4/2002 | Hoffert et al. |
| 6,473,529 | B1 | 10/2002 | Lin |
| 6,834,308 | B1 | 12/2004 | Ikezoye et al. |
| 7,336,841 | B2 | 2/2008 | Neogi |
| 7,523,312 | B2 | 4/2009 | Kalker et al. |
| 7,809,154 | B2 | 10/2010 | Lienhart et al. |
| 2003/0126276 | A1 | 7/2003 | Kime et al. |
| 2004/0021669 | A1 | 2/2004 | Fredlund et al. |
| 2004/0240562 | A1* | 12/2004 | Bargeron et al. ........ 375/240.29 |
| 2005/0141707 | A1 | 6/2005 | Haitsma et al. |
| 2005/0213826 | A1 | 9/2005 | Neogi |
| 2006/0129822 | A1* | 6/2006 | Snijder et al. ................. 713/176 |
| 2006/0184961 | A1 | 8/2006 | Lee et al. |
| 2007/0055987 | A1 | 3/2007 | Lu et al. |
| 2007/0071330 | A1 | 3/2007 | Oostveen et al. |
| 2007/0124796 | A1 | 5/2007 | Wittkotter |
| 2007/0136782 | A1 | 6/2007 | Ramaswamy et al. |
| 2007/0162571 | A1 | 7/2007 | Gupta et al. |
| 2007/0186228 | A1 | 8/2007 | Ramaswamy et al. |
| 2007/0186229 | A1 | 8/2007 | Conklin et al. |
| 2008/0148309 | A1 | 6/2008 | Wilcox et al. |
| 2008/0310731 | A1 | 12/2008 | Stojancic et al. |
| 2009/0063277 | A1 | 3/2009 | Bernosky et al. |
| 2009/0074235 | A1 | 3/2009 | Lahr et al. |
| 2009/0092375 | A1 | 4/2009 | Berry et al. |
| 2009/0154806 | A1 | 6/2009 | Chang et al. |
| 2009/0213270 | A1 | 8/2009 | Ismert et al. |
| 2009/0324199 | A1 | 12/2009 | Haitsma et al. |
| 2010/0077424 | A1 | 3/2010 | Ramaswamy et al. |
| 2010/0122279 | A1 | 5/2010 | Zhang |
| 2010/0158488 | A1 | 6/2010 | Roberts et al. |
| 2010/0169911 | A1 | 7/2010 | Zhang |
| 2010/0306791 | A1 | 12/2010 | Deng |

FOREIGN PATENT DOCUMENTS

| | | |
|---|---|---|
| CN | 1262003 A | 8/2000 |
| CN | 1341240 A | 3/2002 |
| CN | 1574953 A | 2/2005 |
| CN | 1628302 A | 6/2005 |
| CN | 1679051 A | 10/2005 |
| CN | 1679261 A | 10/2005 |
| CN | 1719909 A | 1/2006 |
| CN | 1723458 A | 1/2006 |
| CN | 1739121 A | 2/2006 |
| CN | 2914526 Y | 6/2007 |
| CN | 101002472 A | 7/2007 |
| CN | 101021852 A | 8/2007 |
| CN | 101047833 A | 10/2007 |
| CN | 101120594 A | 2/2008 |
| EP | 0838960 A2 | 4/1998 |
| EP | 1482734 A2 | 12/2004 |
| EP | 1760693 A1 | 3/2007 |
| GB | 2419489 A | 4/2006 |
| JP | 9274467 A | 10/1997 |
| KR | 20020001088 A | 1/2002 |
| WO | WO 0209447 A1 | 1/2002 |
| WO | WO 02065782 A1 | 8/2002 |
| WO | WO 2006/059053 A1 | 6/2006 |
| WO | WO 2007/080133 | 7/2007 |
| WO | WO 2007148264 A1 | 12/2007 |

OTHER PUBLICATIONS

Non-final Office Action dated Oct. 26, 2010, for U.S. Appl. No. 12/085,754.
Final Office Action dated Apr. 12, 2011, for U.S. Appl. No. 12/085,754.
Non-final Office Action dated Nov. 29, 2010, for U.S. Appl. No. 12/085,927.
Final Office Action dated May 26, 2011, for U.S. Appl. No. 12/085,927.
Non-final Office Action dated Oct. 13, 2010, for U.S. Appl. No. 12/085,765.
Final Office Action dated Mar. 31, 2011, for U.S. Appl. No. 12/085,765.
Non-final Office Action dated Aug. 30, 2010, for U.S. Appl. No. 12/085,829.
Final Office Action dated May 19, 2012, for U.S. Appl. No. 12/085,829.
Non-final Office Action dated Oct. 29, 2010, for U.S. Appl. No. 12/085,835.
Final Office Action dated Apr. 13, 2011, for U.S. Appl. No. 12/085,835.
Non-final Office Action dated Dec. 1, 2010, for U.S. Appl. No. 12/085,827.
Final Office Action dated Apr. 19, 2012, for U.S. Appl. No. 12/085,827.
Non-final Office Action dated Oct. 13, 2010, for U.S. Appl. No. 12/085,764.
Final Office Action dated Mar. 24, 2011, for U.S. Appl. No. 12/085,764.
Cheung et al., "Efficient Video Similarity Measure With Video Signature", Jan. 2003.
Oostveen et al., "Feature Extraction and a Database Strategy for Video Fingerprinting", 2002.
Non-final Office Action dated Nov. 10, 2010, for U.S. Appl. No. 12/085,834.
Final Office Action dated Mar. 25, 2011, for U.S. Appl. No. 12/085,834.
Non-final Office Action dated Dec. 14, 2010, for U.S. Appl. No. 12/085,823.
Notice of Allowance and Fees Due dated Aug. 19, 2011, for U.S. Appl. No. 12/085,823.
Non-final Office Action dated Jul. 26, 2012, for U.S. Appl. No. 12/085,752.
International Preliminary Report on Patentability and Written Opinion dated Dec. 25, 2008, for PCT Application No. PCT/CN2008/071039.
International Search Report dated Dec. 25, 2008, for PCT/CN2008/071039.
International Preliminary Report on Patentability and Written Opinion dated Feb. 26, 2009, for PCT Application No. PCT/CN2008/071083.
International Search Report dated Feb. 26, 2009, for PCT Application No. PCT/CN2008/071083.
International Preliminary Report on Patentability and Written Opinion dated Mar. 12, 2009, for PCT Application No. PCT/CN2008/071082.
International Search Report dated Mar. 12, 2009, for PCT Application No. PCT/CN2008/071082.
International Preliminary Report on Patentability and Written Opinion dated Sep. 4, 2008, for PCT Application No. PCT/CN2008/071046.
International Search Report dated Sep. 4, 2008, for PCT Application No. PCT/CN2008/071046.
International Preliminary Report on Patentability and Written Opinion dated Sep. 4, 2008, for PCT Application No. PCT/CN2008/071047.
International Search Report dated Sep. 4, 2008, for PCT Application No. PCT/CN2008/071047.
International Preliminary Report on Patentability and Written Opinion dated Mar. 5, 2009, for PCT Application No. PCT/CN2008/071023.
International Search Report dated Mar. 5, 2009, for PCT Application No. PCT/CN2008/071023.
International Preliminary Report on Patentability and Written Opinion dated Mar. 5, 2009, for PCT Application No. PCT/CN2008/071028.
International Search Report dated Mar. 5, 2009, for PCT Application No. PCT/CN2008/071028.
International Preliminary Report on Patentability and Written Opinion dated Feb. 19, 2009, for PCT Application No. PCT/CN2008/071029.
International Search Report dated Feb. 19, 2009, for PCT Application No. PCT/CN2008/071029.

International Preliminary Report on Patentability and Written Opinion dated Feb. 12, 2009, for PCT Application No. PCT/CN2008/071030.
International Search Report dated Feb. 12, 2009, for PCT Application No. PCT/CN2008/071030.
International Preliminary Report on Patentability and Written Opinion dated Feb. 26, 2009, for PCT Application No. PCT/CN2008/071038.
International Search Report dated Feb. 26, 2009, for PCT Application No. PCT/CN2008/071038.
International Preliminary Report on Patentability and Written Opinion dated Feb. 26, 2009, for PCT Application No. PCT/CN2008/071033.
International Search Report dated Feb. 26, 2009, for PCT Application No. PCT/CN2008/071033.
International Preliminary Report on Patentability and Written Opinion dated Oct. 16, 2008, for PCT Application No. PCT/CN2008/071041.
International Search Report dated Oct. 16, 2008, for PCT Application No. PCT/CN2008/071041.
English Abstract of JP 9274467 A dated Oct. 21, 1997.
English Abstract of CN 101002472 A dated Jul. 18, 2007.
English Abstract of CN 1739121 A dated Feb. 22, 2006.
English Abstract of CN 101120594 A dated Feb. 6, 2008.
English Abstract of CN 1719909 A dated Jan. 11, 2006.
English Abstract of WO 0209447 A1 dated Jan. 31, 2002.
English Abstract of CN 101047833 A dated Oct. 3, 2007.
English Abstract CN 2914526 Y dated Jun. 20, 2007.
English Abstract CN 1262003 A dated Aug. 2, 2000.
English Abstract CN 2387588 Y dated Jul. 12, 2000.
English Abstract CN 1679261 A dated Oct. 5, 2005.
English Abstract CN 1574953 A dated Feb. 2, 2005.
English Abstract CN 1628302 A dated Jun. 15, 2005.
English Abstract CN 1190218 A dated Aug. 12, 1998.
English Abstract CN 1341240 A dated Mar. 20, 2002.
English Abstract CN 1723458 A dated Jan. 18, 2006.
English Abstract CN 101021852 A dated Aug. 22, 2007.
English Abstract CN 1679051 A dated Oct. 5, 2005.
English Abstract KR 20020001088 A dated Jan. 9, 2002.
Non-final Office Action dated Jan. 2, 2013, for U.S. Appl. No. 12/085,764.
Notice of Allowance and Fees Due dated Jan. 4, 2013 for U.S. Appl. No. 12/085,927.
Notice of Allowability dated Feb. 15, 2013, for U.S. Appl. No. 12/085,927.
Notice of Allowance and Fees Due dated Mar. 4, 2013 for U.S. Appl. No. 12/085,834.

* cited by examiner

The 5 different samples within the same video image

Samples for consecutive frame images

Subsample only the first N frames

Subsample N frames periodically

Subsample all frames

All of the frames of a video title

MySQL, Oracle

Plot of the time-series of the correlation between two fingerprint arrays A and B.

US 8,437,555 B2

METHOD FOR IDENTIFYING MOTION VIDEO CONTENT

RELATED APPLICATIONS

This application is the U.S. National Phase under 35 U.S.C. §371 of International Application No. PCT/CN2008/071046, filed on May 22, 2008, which in turn claims the benefit of U.S. Provisional Application No. 60/966,201, filed on Aug. 22, 2007, the disclosures of which Applications are incorporated by reference herein.

FIELD OF THE PRESENT INVENTION

The present invention relates to a method for identifying motion video content, more particularly, the present invention relates to a method for identifying fingerprints of motion video content.

The so called term "fingerprint" appearing in this specification means a series of dot information, in which each dot information is selected from a frame of pattern of television signals, and a plurality of frames can be selected from the television signals, and one or more dot data can be selected from one frame of pattern of television signals, so that the so called "fingerprint" can be used to uniquely identify the said television signals.

BACKGROUND OF THE PRESENT INVENTION

This document describes systems and methods for identifying video content. Video is the best way to distribute information to the masses. Today, almost all video content is created in digital forms, from the moment of video capture, to production, editing and special effects, and compression and distribution. In addition, increasing amount of video content is stored on DVDs, tapes, computer servers, and mass storage arrays.

Organizing digital video content is becoming a major challenge for all content owners, video and broadband internet service providers, and even home users. This is because unlike text, video content cannot be searched and identified easily by computers. Unlike audio, video content data has far large data size. In addition, it is very difficult and inefficient to identify video content by human interactions since the process is very time-consuming and cannot be scaled. These factors makes it difficult to effectively organize, archive, and search video content. However, the need for searching and identifying video content is increasingly important with the increasing bandwidth available on the network and the lowering cost of digital storage devices.

Therefore, there is a need to identify video content efficiently and with minimal or no human interactions.

SUMMARY OF THE INVENTION

It is an object of the present invention to provide a method for identifying motion video content, which can effectively organize, archive, and search video content.

It is another object of the present invention to provide a method for identifying motion video content, which can lower the cost of digital storage devices.

It is another object of the present invention to provide a method for identifying motion video content, which can identify video content efficiently and with minimal or no human interactions.

It is another object of the present invention to provide a method for identifying motion video content, which can be used to extract information from a given video content segment and use the extracted information to further automatically identify the same video content if it is ever to appear again in a different video data stream.

Therefore, in the present invention, there is provided a method for identifying motion video content, forming a registered fingerprint database in advance for video contents of broadcasting video signals, wherein said method at least comprises the steps of storing a consecutive of video frame images of a motion video content to be identified into a frame buffer; obtaining sample values on the video frame images by a frame sampler; holding the sample values in a fingerprint store as a fingerprint A for search in the fingerprint database; and performing a fingerprint pattern matching algorithm between the fingerprint A for search in the fingerprint database and fingerprints B contained in the fingerprint database so as to determine whether the motion video content has ever been broadcasted before.

The method according to the present invention can effectively organize, archive, and search video content; lower the cost of digital storage devices; and identify video content efficiently and with minimal or no human interactions.

BRIEF DESCRIPTION OF THE ACCOMPANYING DRAWINGS

FIG. 1. is a schematic view of the key steps of sub-sampling the video frames.

FIG. 2. is a schematic view showing the matching process to determine whether original video contents A and B are identical at least for the sections associated with the matching fingerprint.

DETAILED DESCRIPTION OF THE INVENTION

Figure 1:
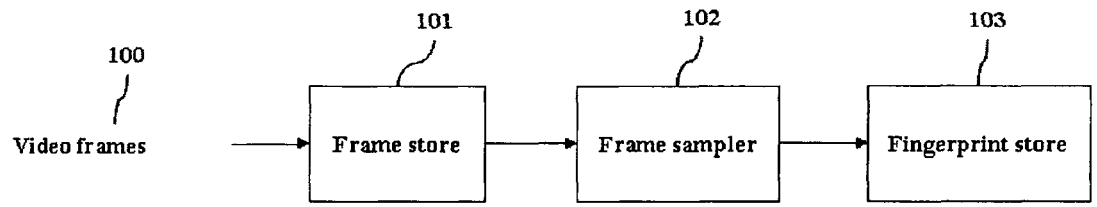

In what follows, it provide descriptions for a method that can be used extract information from a given video content segment and use the extracted information to further automatically identify the same video content if it is ever to appear again in a different video data stream.

The capability to correctly identify video content has many important applications. These include but not limited to the following:

video search video monitoring video splicing
video switching
video advertising

In what follows, it will first describe methods for extracting information from a given video content data, and calling the fingerprinting process. Then, it will describe how to use the fingerprint data to seek a match within a different video content.

In all following discussions, it will focus on the handling of video signals, although in most cases, video signal comes together with audio signals as an integral part of the audio/video program. The audio signal will be considered in synchronization with the video signal. Fingerprint operations on the video signal identify the video content as well as the associated audio content. Therefore, for the remainder of this document, it will limit discussions on dealing with fingerprint operations on video signal only.

It is also assumed that the video data has been digitized. It's possible to extend the idea to analog video content as well by first digitizing the analog video signal into digital data streams before applying the methods described herein. Therefore, it will not discuss how to deal with analog video content in this document.

In addition, it is assumed that the digital video content is in uncompressed formats. For compressed video content, decompression (or decoding) of the video data stream is required before applying the method used herein.

Lastly, it is assumed that all video frames are in progressive format, which means that each video frame is displayed at the decoder together. For interlaced video frames, the frame is displayed in two separate time instances as two (top and bottom) fields. In this case, it is assumed that all of the processing described below applies to one of the fields.

Digital video data in uncompressed format can be represented by time sequence of video frames. Each frame can be described as a two dimensional array of pixel values. Each pixel value can be further decomposed into brightness (luminance) and color (chrominance) components. For the purpose of obtaining and searching through video content, we only use the luminance pixel values of the video frames.

Digital video content consists of time-consecutive frames that, when presented to the human visual system, presents the illusion of continuous motion. It first describes the methods for extracting information from these video frames so that the extracted information can be used to identify the frame.

The steps required to perform the fingerprint matching can be summarized as follows
fingerprint data extraction for video A;
organize the extracted fingerprint data from video A into a database;
fingerprint data extraction from video B; and
perform fingerprint pattern matching algorithm between the two fingerprints.

In what follows, we describe each of the steps in some details.

2.1 Fingerprint Extraction

The easiest way to do this would be to record all of the video frames and save them in a disk storage. The drawback of this problem, of course, is the tremendous amount of data storage capacity required. In addition, storage bandwidth limitations make it more difficult to rapidly retrieve the stored video frames.

The described method in this document starts with the first step of sub-sampling the video frames. Specifically, for each video frame, it performs a spatial sub-sampling, where a fixed number of samples are taken from the video frame and stored as sample values. The key steps can be illustrated in FIG. 1.

The video frames 100 consists of time-continuous video images. Each video frame is first held in the frame store 101, and then a frame sampler 102 is used to obtain the sampled value from frame store 101. The results are saved in fingerprint store 103. We describe each of the steps in some greater detail below.

2.1.1 Video Frame Sub-Sampling

Figure 5:
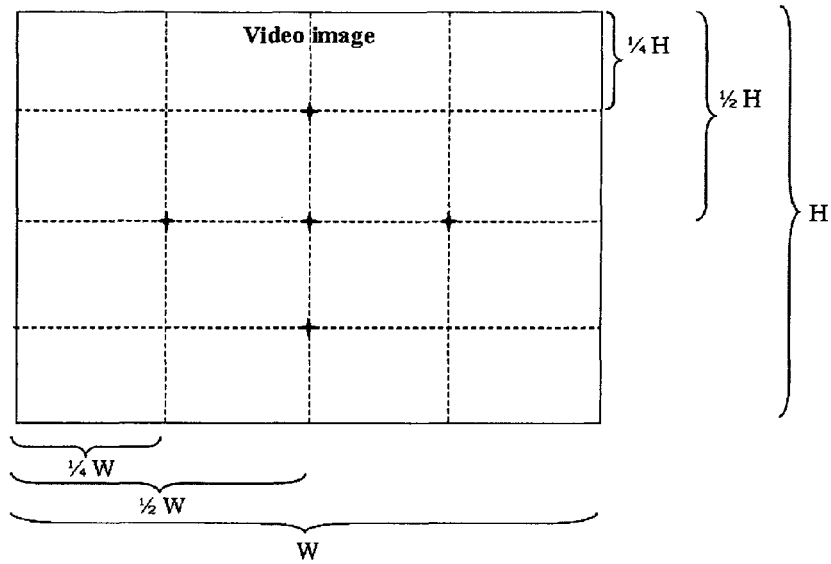
FIG. 5 shows a preferable scheme for sub-sampling of the frame.

One preferable sub-sampling scheme is to take 5 samples at different locations of the video frame. These samples should be taken as evenly distributed in the frame as possible, with the center of the frame as the center of the sub-sampling. One preferable sub-sampling of the frame is shown in FIG. 5. In this scheme, the 5 samples are spaced apart as an integer fraction of the frame resolution. If the video frame height is H and width is W, then the 5 samples are spaced at the intersections of ½ H, ¼ H, ¾ H and ½ W, ¼ W and ¾ W, as shown in FIG. 5.

Of course, there can be other methods of sub-sampling, but it will continue to use the above sub-sampling scheme to describe the rest of the methods. Those skilled in the art will be able to expand the method to other sub-sampling schemes, with more or less than 5 samples per video frame, or sub-sampling at varying number of pixels per video frame.

This sampling scheme is independent of the frame resolution or aspect ratio, making it more robust for dealing with video content of different resolutions and aspect ratios.

2.1.2 Sub-Sampling of Multiple Video Frames

Figure 6:
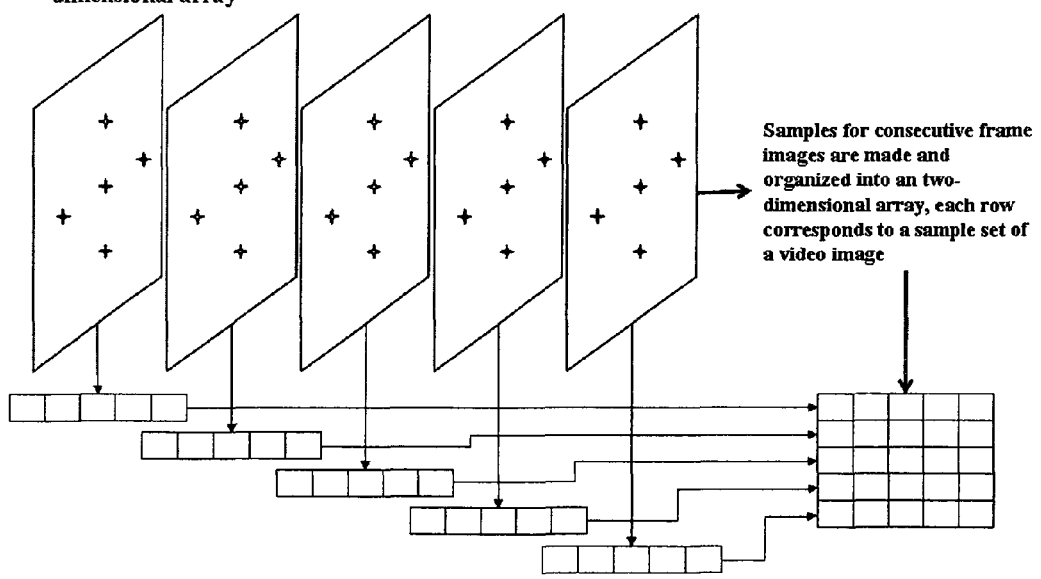
FIG. 6 shows the sub-sampling process for each video frame.
Figure 7:
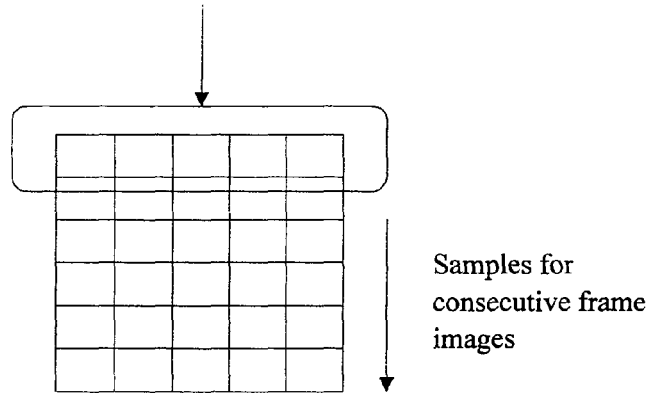
FIG. 7 shows how the sampled values are organized.

The sub-sampled values are saved for each of the frames. From the above description, it is noted that 5 frame samples are obtained for each video frame. It repeats this process for several consecutive N number of video frames. For example, it can sub-sample N=50 consecutive video frames, and then organize the sub-sampled values into a 5×50 array. This sub-sampling process is shown in FIG. 6 and how the sampled values are organized is shown in FIG. 7.

This array is what we called the fingerprint of the video content. From the above description, it is noted that the fingerprint covers only 50 video frames, for PAL video format, it's 2 seconds worth of video, for NTSC, it's less then 2 seconds. If it can uniquely identify this N video frames through the sub-sampled values, then it can significantly reduce the computation and storage required for the identification.

The fingerprint only identifies the 50 video frames within the video content, but not the remainder of the video content. For most video content, where the content titles are usually static, uniquely identifying a segment of the content is sufficient to uniquely identifying the entire video content title.

For those content where segments of which may be re-arranged, it may need to sub-sampling more frames. Therefore, there are provided several preferable ways to determine the number of video frames to sub-sample, that is
sub-sample N consecutive video frames on somewhere in the video content, for example at the beginning of the video content;
sub-sample N consecutive video frames at fixed time intervals; and
sub-sample all of the video frames for the entire video content title.

Figure 8:
FIG. 8 illustrates several preferable ways to determine the number of video frames to sub-sample.
Figure 8:
Figure 8:
Figure 9:
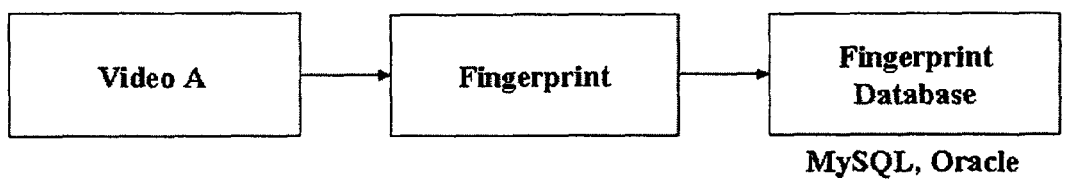
FIG. 9 shows a general process of fingerprint extraction.

This can be illustrated in FIG. 8. Obviously, the first method requires the least amount of computations, memory and storage. The last method requires the most.

Each consecutively sampled video frames results in a continuous two-dimensional array of sampled values. This sampled array is the so-called fingerprint for the sampled video content.

From the above, it is noted that depending on the sampling method used, there may be more than one fingerprint array for a given video content. For the first and the third sampling methods, there is only one fingerprint, for the second sampling method, there can be multiple fingerprint arrays, each identifying a corresponding segment of the video content. Of course, multiple consecutive fingerprint arrays can be organized into more complex fingerprint arrays, which will not be discussed in this document.

In what follows, it focus our discussions on the handling of a single fingerprint array.

2.2 Fingerprint Matching

In this section, it describes methods for the inverse of the fingerprinting process, i.e., to use the given fingerprint array to seek a match within a different video content stream which may match partially or entirely the video content represented by the fingerprint.

There are several different scenarios between the two video contents. Let's call the video content, from which the fingerprint is extracted, as video A, and call the video content, which it will seek to find a match with the video A fingerprint, as video B. If such a match is determined to be true, then it concludes that original video contents A and B are identical at least for the sections associated with the matching fingerprint. This process can be illustrated in FIG. 2.

Then video A and B may contain identical video content albeit they may be of different resolution, aspect ratio and possibly with different levels of quality degradations. For the purpose of discussions, this document will not address these different scenarios. Instead, it will focus on how to seek a match between the fingerprints from the two video sequences.

Figure 2:
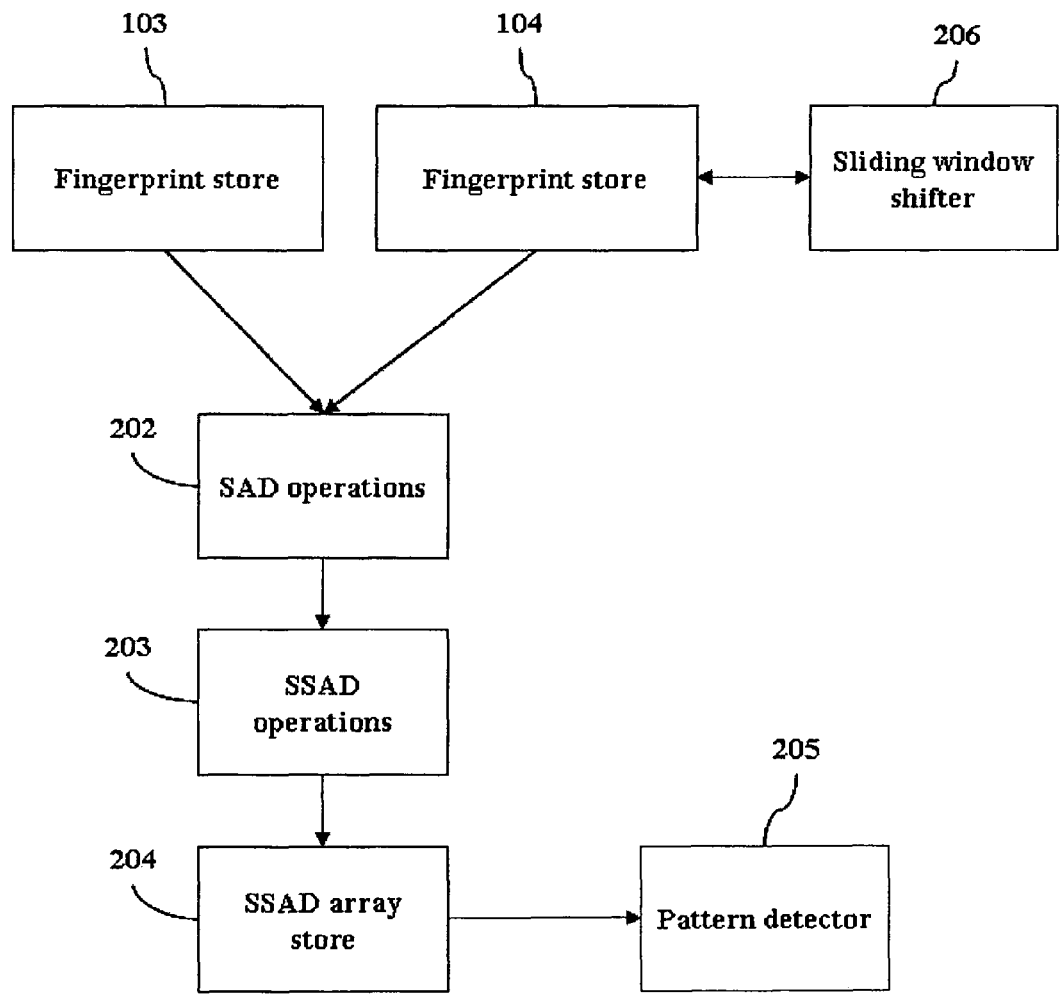

Specific steps can be illustrated in FIG. 2, specifically, two fingerprint stores hold the data that will go through several steps of processing to determine if they are a match or not.

2.2.1 The Sum of Absolute Difference Operations

Figure 10:
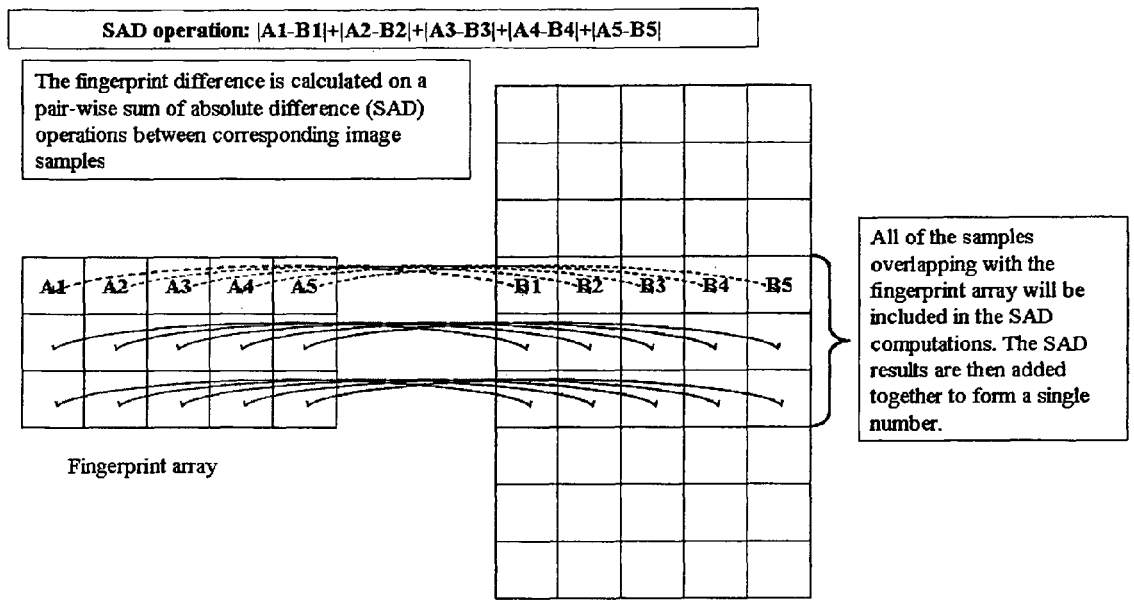
FIG. 10 shows the fingerprint matching algorithm on SAD operations which are performed between the samples obtained from two video frames.
Figure 11:
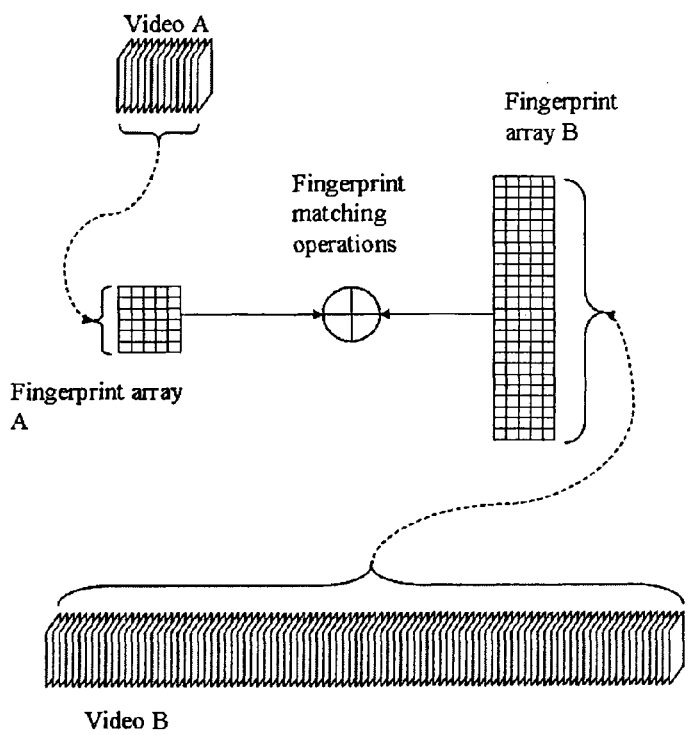
FIG. 11 shows the matching operations performed between the samples obtained from two video frames.

The key processing required for the fingerprint matching algorithm is the Sum of Absolute Difference (SAD) operations between the two fingerprints. The operation is performed between the samples obtained from two video frames. Specifically, consider the example given in FIG. 10 where 5 samples are obtained from the video frame A. Let's denote these samples as A1, A2, A3, A4, A5. We also obtain 5 samples from the video frame B, and denote the samples as B1, B2, B3, B4, B5. Then, the SAD operation between these two frames are given by:

$$SAD(A,B)=|A1-B1|+|A2-B2|+|A3-B3|+|A4-B4|+|A5-B5| \quad (EQ\ 1)$$

where the |A-B| is the absolute value operation.

The SAD operation basically evaluates the differences between the sample sets of the two video frames A and B. Larger value of SAD(A,B) implies bigger image content differences between the two video frames. This process can be illustrated in FIG. 10.

2.2.2 The Moving SAD Window and Sum of SAD (SSAD) Array

The SAD operation described above is repeated for two fingerprint arrays, one obtained from fingerprint A and the other obtained from the fingerprint B. The goal is to search through fingerprint B to see if there is a subsection of which that matches fingerprint A. The fingerprint A is assumed to have less number of samples than fingerprint B. The moving window of SAD operation defined as follows:

First, fingerprint A and B are item-wise associated with each other, because fingerprint A is smaller than fingerprint B in number of samples, only some of the samples from fingerprint B are associated with those within fingerprint A.

Next, all of the fingerprint B samples within this window are included in the SAD operations with fingerprint A samples, and the results are added together to form a single sum of SAD (SSAD) number.

The same process is then repeated by shifting the position of fingerprint B relative to A by one frame. Each such shift results in a new SSAD value generated. Therefore, a series of SSAD values are generated and saved in a SSAD array.

Figure 12:
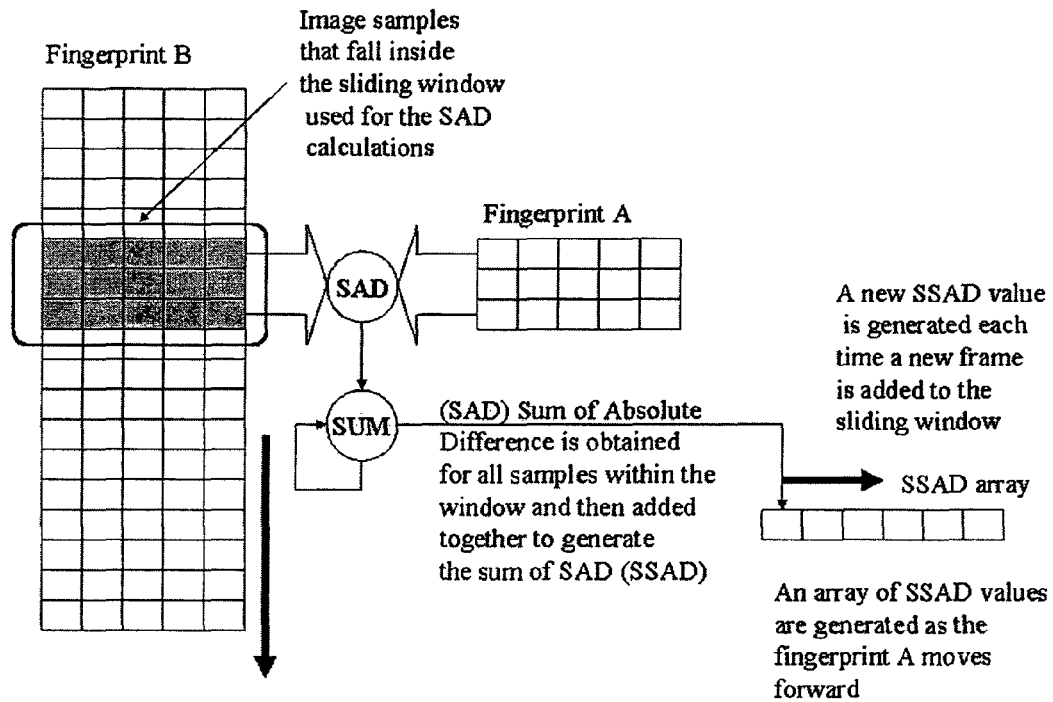
FIG. 12 illustrates how a series of SSAD values are generated.

This process can be illustrated in FIG. 12.

2.2.3 The Fingerprint Match Detection

The fingerprint match detection is a process applied to the SSAD time-series of numbers. From the previous descriptions, it is noted that SSAD time-series represents a time-shifted measure of the difference between two video frame sequences under comparison. When the SSAD value is low, it means that the two sections of fingerprinted video frames are similar, otherwise they are not. However, due to the fact that different resolution, different video quality degradation (due to compression), and different noise level all contribute to the increase in SSAD values, so the absolute values of the SSAD series themselves are not sufficient to determine the location of a possible fingerprint match.

Figure 13:
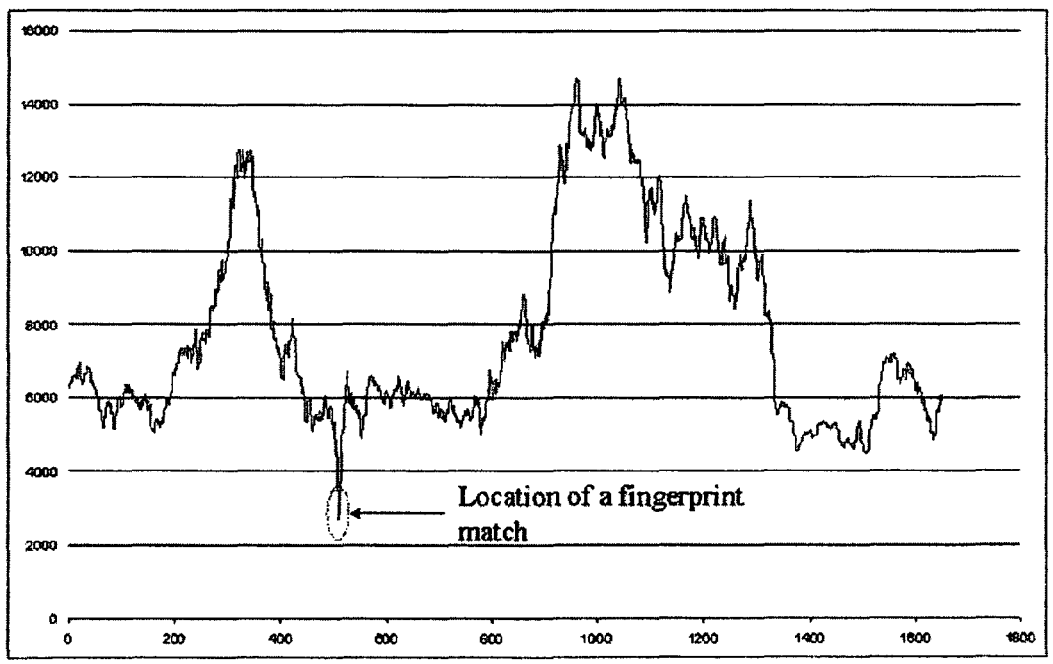
FIG. 13 show that the fingerprint match is identified by a very sharp drop in the SSAD values just before the match and a very sharp increase in SSAD values just after the match.

The fingerprint match is identified by a very sharp drop in the SSAD values just before the match and a very sharp increase in SSAD values just after the match. This can be shown in an actually measured SSAD values in FIG. 13.

Figure 3:
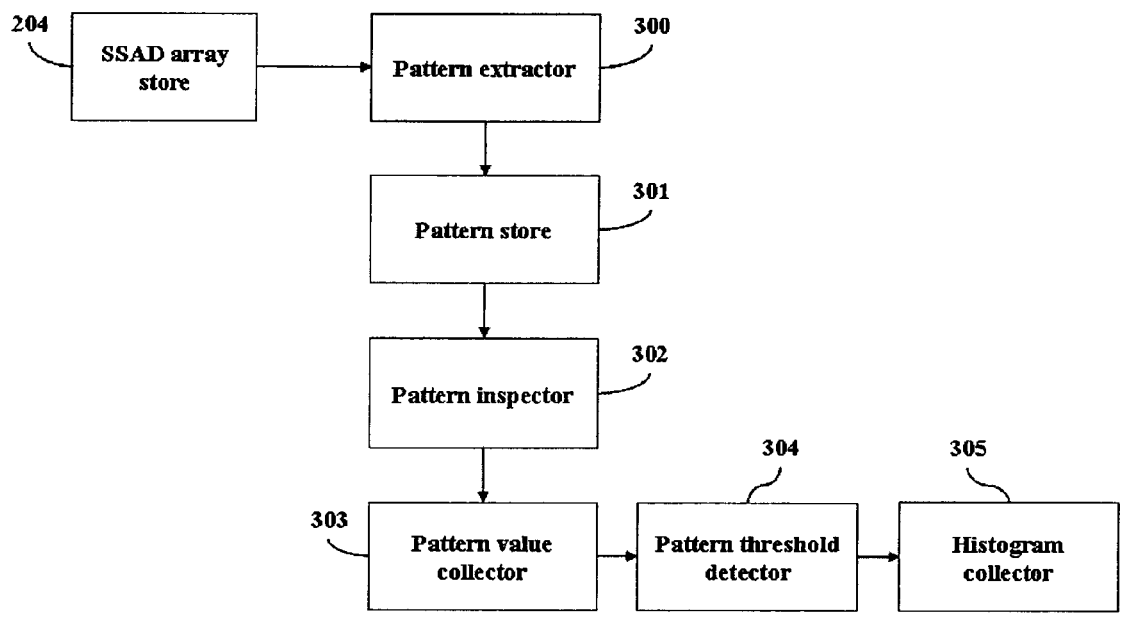
FIG. 3 illustrates the key element to detect the sharp drop pattern within the SSAD values.
Figure 4:
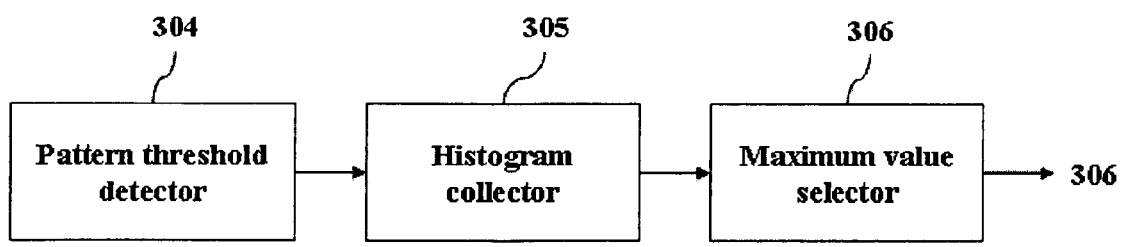
FIG. 4 illustrates the further key element to detect the sharp drop pattern within the SSAD values.

The key element to detect the sharp drop pattern within the SSAD values can be illustrated in FIG. 3. In this diagram, the SSAD values are stored in 204. The pattern extractor inspects all neighboring SSAD values and obtain the so-called the pattern values. Specifically, if SSAD values are S(1), S(2), ..., S(n), S(n+1), and denote the derived pattern values as P(1), P(2), P(3), and so forth.

Clearly, S(n) represents the difference between video A and video B on their respective n-th frame within the fingerprint window. Note that for video fingerprint B, the index n refers to a different video frame each time the fingerprint array B is shifted by one frame relative to fingerprint array A.

The pattern values can be obtained by the pattern extractor 300, which is described as follows:

$$P(n)=(S(n)-S(n-1))/S(n) \quad (EQ\ 2)$$

Note that P(1) is not defined and will not be used. In addition, it does the above only if S(n) is not zero and above certain fixed threshold. Otherwise, P(n) is set to zero.

From this, it can tell that P(n) is a positive number if S(n)>S(n-1), i.e., the SSAD value is increasing, it means that the two represented video frames are diverging from each other, indicating less probability that a match will be found. On the other hands, if P(n) is a negative number, it means that the two video frames are increasingly more similar to each other. The value of P(n) represents the percentage of the change of S(n), and larger P(n) means more rapid change in values of S(n) vs. S(n-1).

The extracted pattern values form another series of numbers which are then stored in pattern store 301.

The pattern inspector 302 inspects the values contained in pattern store 301 by the following steps:

Select a specific position, say m, within the pattern store 301 and identify all of the values within a window of size 2M-1 of position m:

P(m-M+1), P(m-M+2), ..., P(m-1), P(m),
P(m+1), ..., P(m+M-2), P(m+M-1) (EQ 3)

These values are then added together by the pattern value collector 303 and yields a result C(m), in the following way:

C(m)=-P(m-M+1)-...-P(m-1)-P(m)+
P(m+1)+...+P(m+M-1) (EQ 4)

From the above, it is noted that C(m) will be a large number when there is a sharp dip in the values of pattern values P (...) at position m. Otherwise, C(m) tends to be small values.

Finally, the value C(m) is compared with a user given threshold 304 to determine if a match has been found between the two fingerprints, and the frame number is determined through the above process and signaled as output to histogram collector, shown in FIG. 3.

The histogram collector 305 gathers all of the pattern values C(m) that have exceeded the given threshold, count the number of times each value exceeded the threshold, and store them into an array. Each item in the array holds the value m, C(m) and the number of times that C(m) has crossed the threshold. Finally, the maximum value selector 306 inspect all such values within the histogram for the value that has appeared the most number of times. This value refers to the frame that is identified as the fingerprint matched frame.

The invention claimed is:

1. A computer-implemented method for identifying motion video content, comprising the steps of:
    storing into a frame buffer a plurality of video frame images of a motion video content;
    obtaining sample values on the video frame images by a frame sampler;
    holding the sample values on a plurality of video frame images obtained from the frame sampler in a fingerprint store as a fingerprint A;
    storing each of a plurality of fingerprint stores as an entry in a fingerprint database;
    retrieving an entry of at least one fingerprint pattern from the fingerprint database as fingerprint B;
    performing a fingerprint matching operation between the fingerprint A and the fingerprint B, comprising the steps of:
        calculating a sum of absolute difference (SAD) between the fingerprint A and the fingerprint B, wherein:
        $SAD(A,B)=|A1-B1|+|A2-B2|+|A3-B3|+|A4-B4|+|A5-B5|+...$; $|...|$ is the absolute value operation;
        the samples obtained from the first video frame of the fingerprint A are denoted as A1, A2, A3, A4, A5,...;
        samples obtained from the first video frame of the fingerprint B within a sliding window are denoted as B1, B2, B3, B4, B5, ...; and
        A1 and B1, A2 and B2, ..., A5 and B5, ... are on the same location of a frame from video A and a frame from video B respectively;
    repeating the SAD operation between the samples from the second frame from video A and the second frame from video B so that for every video frames of the fingerprint A and possible fingerprint B, until all of the frames in video A are included in the calculation, the results are added together to form a single sum of SAD (SSAD) number;
    shifting the position of fingerprint B relative to A by one frame to generate a new SSAD; and
    generating and storing an SSAD array from the SAD values;
    in response to a match, determining video content associated with the fingerprint A as identical with video content associated with the fingerprint B; and
    in response to no match, retrieving another entry of at least one fingerprint pattern from the fingerprint database as fingerprint B; and
    repeating the step of performing a fingerprint matching operation between the fingerprint A and the fingerprint B; and
    in response to no match after all entries in the fingerprint database has been operated upon, determining the video content associated with the fingerprint A having no match with the video content associated with the at least one fingerprint pattern in the fingerprint database.

2. The computer-implemented method of claim 1, wherein the SSAD values, denoted as S(1), S(2),..., S(n), S(n+1), are stored in a pattern array store, a pattern extractor inspects all neighboring SSAD values and obtains the pattern values, denoted as P(1), P(2), P(3), and so forth,
    $P(n)=(S(n)-S(n-1))/S(n)$ and with n>1 and S(n) not equal to zero; and
    $P(n)=0$ otherwise;
    where S(n) represents the difference between the fingerprint A and fingerprint B on their respective n-th frame within the fingerprint window, the index n refers to a different video frame each time the fingerprint array B is shifted by one frame relative to fingerprint A;
    the extracted pattern values P(n) for n=1, 2, ..., n, ... form another series of numbers which are then stored in a pattern store, a pattern inspector selects the values contained in pattern store by the following steps:
    selecting a specific position, say m, within the pattern store and identifying all of the values within a window of size 2M−1 of position m:
    P(m−M+1), P(m−M+2), ... P(m−1), P(m), P(m+1), ..., P(m+M−2), P(m+M−1),
    these values are then added together by a pattern value collector and yields a result C(m), in the following way:
    $C(m)=-P(m-M+1)-...-P(m-1)-P(m)+P(m+1)+...+P(m+M-1)$
        where M is a constant which is chosen so that there are sufficient number of values of P to be included in the calculation of C within the sliding window of 2M−1,
        finally, the value C(m) is compared with a user given threshold to determine if a match has been found between the fingerprint A and possible fingerprint B, and the frame number is determined through the above process and output to histogram collector.

3. The computer-implemented method of claim 2, wherein the histogram collector gathers all of the pattern values C(m) that have exceeded the given threshold, counts the number of times each value exceeds the threshold, and stores them into an array, each item in the array holds the value m, C(m) and the number of times that C(m) has crossed the threshold.

4. The computer-implemented method of claim 3, wherein a maximum value selector inspects all such values within the histogram for the value that has appeared the most number of times, this value refers to the frame that is identified as the fingerprint matched frame.

5. The computer-implemented method of claim 1, wherein the sample values are selected for luminance or brightness of the sampled video image.

6. The computer-implemented method of claim 1, wherein the samples are made on the same positions within each video frame, and the same number of video samples are made in each frame and their positions within each frame are fixed from frame to frame.

7. The computer-implemented method of claim 1, wherein the samples are made on the image locations as described below:
    a first location at an intersection of a first line at a distance of about ½ H from a top edge of the frame and a second line substantially perpendicular to the first line and at a distance of about ½ W from a left edge of the frame;

a second location at an intersection of the first line and a third line substantially perpendicular to the first line and at a distance of about ¼ W from the left edge;
   a third location at an intersection of the first line and fourth line substantially perpendicular to the first line and at a distance of about ¾ W from the left edge;
   a fourth location at an intersection of a fifth line substantially parallel to the first line and at a distance of about ¼ H from the top edge and the second line; and
   a fifth location at an intersection of a sixth line substantially parallel to the first line and at a distance of about ¾ H from the top edge and the second line.

8. The computer-implemented method of claim 7, wherein the plurality of locations are assigned to further include:
   a sixth location at an intersection of the third line and the fifth line;
   a seventh location at an intersection of the third line and the sixth line;
   an eighth location at an intersection of the fourth line and the fifth line; and
   a ninth location at an intersection of the fourth line and the sixth line.

\* \* \* \* \*